(12) United States Patent
Nesbitt (10) Patent No.: US 6,881,049 B2
(45) Date of Patent: Apr. 19, 2005

(54) PROCESS FOR PRODUCING POLYBUTADIENE GOLF BALL CORES

(75) Inventor: R. Dennis Nesbitt, Westfield, MA (US)

(73) Assignee: Callaway Golf Company, Carlsbad, CA (US)

( * ) Notice: Subject to any disclaimer, the term of this patent is extended or adjusted under 35 U.S.C. 154(b) by 401 days.

(21) Appl. No.: 09/826,727

(22) Filed: Apr. 5, 2001

(65) Prior Publication Data

US 2001/0026027 A1 Oct. 4, 2001

Related U.S. Application Data

(62) Division of application No. 09/248,016, filed on Feb. 10, 1999, now Pat. No. 6,258,302.

(51) Int. Cl.[7] .............................................. B29C 47/08
(52) U.S. Cl. ..................... 425/112; 425/207; 425/363; 425/382.3; 425/463; 425/340; 425/327; 425/377
(58) Field of Search ............................ 425/382.3, 207, 425/377, 327, 131.1, 112, 363, 340, 463

(56) References Cited

U.S. PATENT DOCUMENTS

| | | | |
|---|---|---|---|
| 2,693,348 A | 11/1954 | Ellerman | 366/85 |
| 3,664,789 A | 5/1972 | Gibney | 425/131.1 |
| 4,060,368 A | 11/1977 | Theysohn | 425/380 |
| 4,065,537 A | 12/1977 | Miller et al. | 264/143 |
| 4,085,937 A * | 4/1978 | Schenk | 473/352 |
| 4,127,373 A | 11/1978 | Anders et al. | 425/192 R |
| 4,304,539 A * | 12/1981 | Hagiwara et al. | 425/145 |
| 4,332,202 A | 6/1982 | Martinez | 105/199.3 |
| 4,773,763 A | 9/1988 | Weber | 366/53 |
| 4,859,166 A | 8/1989 | Hamada et al. | 425/204 |
| 4,963,309 A | 10/1990 | Gohlisch et al. | 264/175 |
| 5,244,618 A * | 9/1993 | Kemerer et al. | 264/166 |
| 5,267,788 A | 12/1993 | Rockstedt | 366/85 |
| 5,487,602 A | 1/1996 | Valsamis et al. | 366/81 |
| 5,580,057 A * | 12/1996 | Sullivan et al. | 473/377 |
| 5,855,830 A * | 1/1999 | Abe | 264/40.1 |

* cited by examiner

Primary Examiner—Joseph S. Del Sole (57) ABSTRACT

An improved process for producing polybutadiene golf ball cores is disclosed. The golf ball cores are from polybutadiene rubber compositions having a high Mooney viscosity and/or a high molecular weight and a low dispersity is disclosed. The apparatus includes an internal mixer that compounds a batch of golf ball core stock. A sheeter forms sheets of golf ball core stock and has a sheeter inlet proximate the mixer outlet and a sheeter outlet. A preform shaper forms golf ball core preforms from the sheets of golf ball core stock.

10 Claims, 8 Drawing Sheets

PROCESS FOR PRODUCING POLYBUTADIENE GOLF BALL CORES

CROSS REFERENCE TO RELATED APPLICATIONS

This application is a divisional of application Ser. No. 09/248,016, filed Feb. 10, 1999 now U.S. Pat. No. 6,258,302.

FIELD OF THE INVENTION

This invention relates generally to golf balls, and specifically to golf balls containing polybutadiene cores. In this regard, the present invention concerns an improved process for producing polybutadiene rubber compositions, and the resulting molded cores and finished golf balls produced utilizing such a process.

BACKGROUND OF THE INVENTION

The present invention is directed to improved processing methods for polybutadiene rubber compositions suitable for molded golf ball core constructions. More particularly, the present invention is directed to improved processing methods for polybutadiene rubber compositions having a high Mooney viscosity and/or a high molecular weight and a low dispersity. The use of such polybutadiene rubber increases the resiliency of a golf ball without increasing the hardness of the ball.

Two of the principal properties involved in the performance of golf balls are resilience and hardness. Resilience is determined by the coefficient of restitution (referred to as "C.O.R."), also expressed as the constant "e", which is the ratio of the relative velocity of two elastic spheres after direct impact to that before impact. More generally, the constant "e" is the ratio of the outgoing velocity to the incoming velocity of a rebounding ball. The coefficient of restitution (i.e. "e") can vary from zero to one, with one being equivalent to an elastic collision and zero being equivalent to an inelastic collision.

Hardness is determined as the deformation (i.e. compression) of the ball under various load conditions applied across the ball's diameter. The lower the compression value, the harder the material.

Resilience (C.O.R.), along with additional factors such as clubhead speed, angle of trajectory, and ball configuration (i.e. dimple pattern), generally determine the distance a ball will travel when hit. Clubhead speed and the angle of trajectory are factors not easily controllable, particularly by golf ball manufacturers. Thus, the factors of concern to manufacturers are the coefficient of restitution (C.O.R.) and the surface configuration of the ball.

The coefficient of restitution of a golf ball is generally measured by propelling a ball at a given speed against a hard surface and electronically measuring the ball's incoming and outgoing velocity. The coefficient of restitution must be carefully controlled in all commercial golf balls in order for the ball to be within the specifications regulated by the United States Golfers Association ("U.S.G.A.").

The U.S.G.A. standards dictate that a "regulation" ball can not have an initial velocity (i.e. the speed off the club) exceeding 255 feet per second (250 feet per second with a 2% tolerance). Since the coefficient of restitution of a ball is related to the ball's initial velocity (i.e. as the C.O.R. of a ball is increased, the ball's initial velocity will also increase), it is highly desirable to produce a ball having a sufficiently high coefficient of restitution to closely approach the U.S.G.A. limit on initial velocity, while having an ample degree of hardness (i.e. impact resistance) to produce enhanced durability.

The coefficient of restitution (C.O.R.) for a solid core golf ball is a function of the composition of the molded core and of the cover. Copending U.S. patent application Ser. No. 09/226,340, filed Jan. 6, 1999 and titled "Golf Ball Cores Formed from Ultra-high Mooney Viscosity Butadiene Rubber", is assigned to the same assignee as the present invention and is hereby incorporated by reference. This copending application discloses an improved polybutadiene composition that exhibits a high Mooney viscosity and/or a high molecular weight and low dispersity that, when utilized to formulate golf ball cores, produces golf balls exhibiting enhanced C.O.R. without increasing hardness.

However, while high molecular weight polybutadiene rubbers exhibit improved C.O.R., they are very difficult to mill. That is, they tend to "bag", crumble, and break into pieces during the milling process. Bagging occurs when the core stock becomes loose and "bags" or droops down away from a roller associated with a conventional two-roll mill (described further below) thus preventing the core stock from being cut by knife blades associated with the mill.

Conventional processing aids can be added to the butadiene rubber (BR) core stock to improve the core stock's milling characteristics. However, the processing aids disadvantageously lower the core stock's coefficient of restitution. Accordingly, it is an object of the present invention to provide improved processing methods for polybutadiene rubber compositions that exhibit a high Mooney viscosity and/or a high molecular weight and a low dispersity.

These and other objects and features of the invention will be apparent from the following summary and description of the invention and from the claims.

SUMMARY OF THE INVENTION

The present invention achieves all of the foregoing objectives and provides, in a first aspect, a processing system for forming golf ball preforms. The processing system includes an internal mixer that compounds a batch of golf ball core stock, the internal mixer having a mixer outlet; a sheeter that forms sheets of golf ball core stock, the sheeter having a sheeter inlet proximate the mixer outlet and having a sheeter outlet, and a preform shaper for forming golf ball core preforms from the sheets of golf ball core stock.

In another aspect, the present invention provides a method of forming golf ball core preforms. The method includes compounding a batch of golf ball core stock in a mixer; sheeting the batch of compounded golf ball core stock with a sheeter, the sheeter including an extruder portion having at least one screw; and shaping golf ball preforms from the sheeted batch of golf ball core stock.

Further scope of the applicability of the invention will become apparent form the detailed description provided below.

BRIEF DESCRIPTION OF THE DRAWINGS

The invention may take form in various components and arrangements of components, and in various steps and arrangements of steps. The drawings are only for purposes of illustrating a preferred embodiment(s) and are not to be construed as limiting the invention.

DETAILED DESCRIPTION OF THE PREFERRED EMBODIMENTS

The present invention concerns the production of solid polybutadiene cores for golf ball construction. The solid cores may be of single (FIG. 1) or multilayer construction (FIG. 2).

Figure 1:
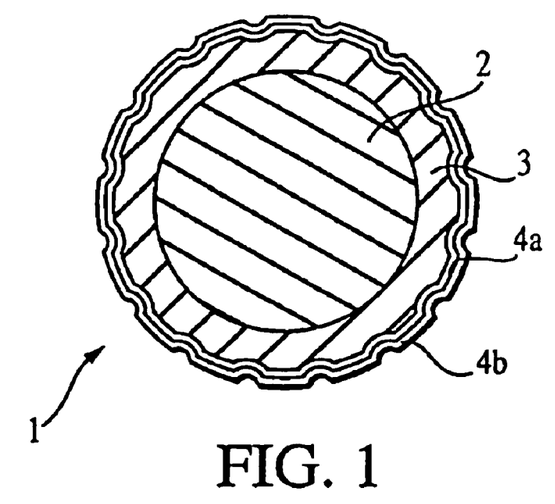
FIG. 1 shows a golf ball (single core) according to the present invention.

Referring now to the drawings, and in particular to FIG. 1, a golf ball 1 according to the present invention is shown. The ball has a core 2, which is solid and is formed from a suitable polybutadiene core composition. A cover 3 surrounds the core 2 to form an unfinished two-piece golf ball. A thin primer coat 4a is applied to the outer surface of cover 3. A thin top coat 4b surrounds the primer coat 4a to form a finished golf ball. The thicknesses of primer coat 4a and top coat 4b are exaggerated for illustrative purposes.

Figure 2:
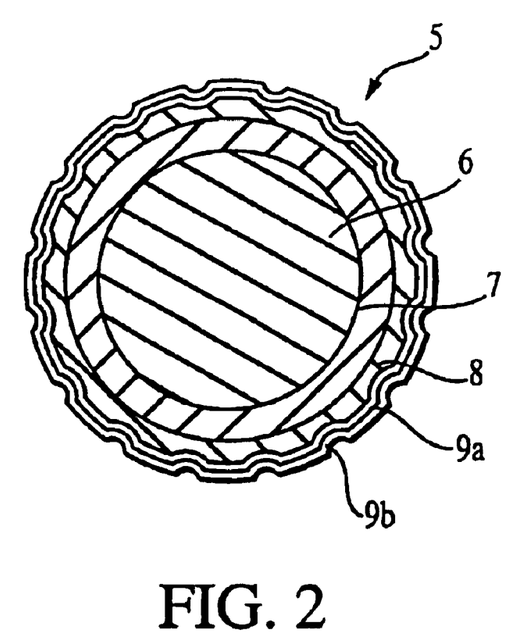
FIG. 2 illustrates another golf ball (dual layer core) according to the present invention.

FIG. 2 shows a further multi-layered embodiment of the invention. The golf ball, which is designated as 5, has an inner core 6, which is solid and is formed from a suitable polybutadiene core composition. An outer core 7 surrounds the inner core 6. One or more ionomeric outer cover layers 8 surround the outer core 7. A thin primer coat 9a is applied to the outer surface of the cover layer 8. A thin top coat 9b surrounds the primer coat 9a. The thicknesses of primer coat 9a and top coat 9b are exaggerated for illustrative purposes.

Figure 3:
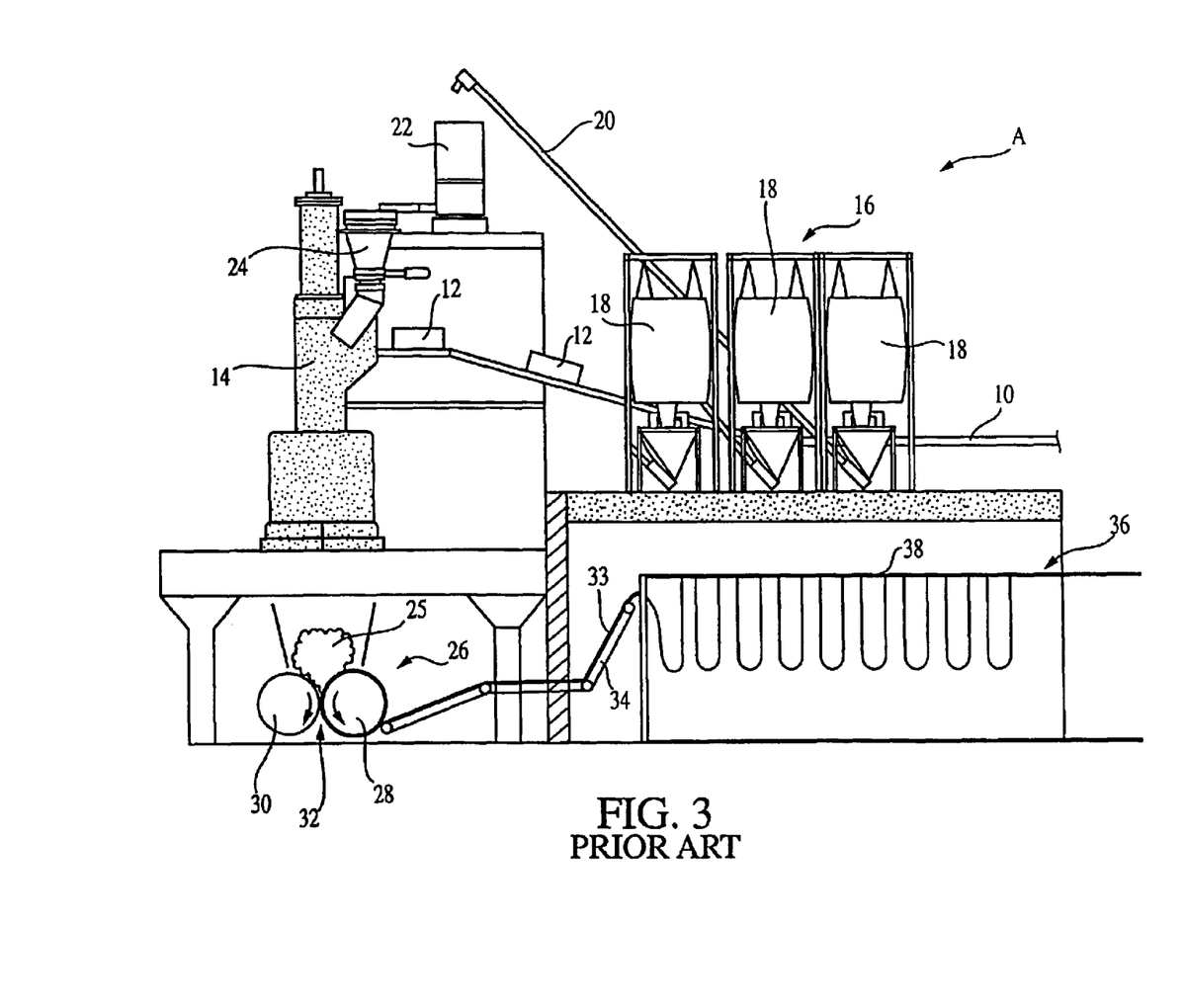
FIG. 3 diagrammatically illustrates a known method of processing butadiene rubber compositions.

FIG. 3 illustrates a known processing system A for compounding a batch of polybutadiene (BR) rubber composition suitable for the molded golf ball core constructions shown in FIGS. 1 and 2. A compounding conveyor line 10 delivers pre-weighed bales of polybutadiene rubber 12 to an internal mixer 14. A bulk storage system 16 includes a number of hoppers 18 for storing bulk powders such as zinc diacrylate (ZDA), zinc, oxide, zinc stearate, polypropylene powder, regrind powder, limestone, etc. A screw conveyor tube(s) 20 delivers one or more of the bulk powders from the bottom of the hoppers to a feeder 22 and weigh cell 24 prior to being delivered to the internal mixer 14. A mixer suitable for use is a Banbury® F-series mixer, such as an F-270 Banbury® mixer, that is manufactured by Farrel Corporation of Ansonia, Conn.

The powders for each batch of core stock are automatically fed, weighed, and conveyed along with the bales of rubber into the throat of the internal mixer 14. The rubber and powders are intimately mixed together within the mixer 14 until a uniform composition is obtained, usually over a period of about 5 to 20 minutes. Typically, the internal rotors and the jacket of the mixer 14 are cooled with chilled water. However, as a result of shear during mixing, the temperature of the approximately 550 lb batch of core stock rises to about 200° F. When mixing is completed, a mixed batch of core stock 25 is dropped through a bottom door of the mixer 14 on to a two-roll mill 26.

The two-roll mill 26 includes horizontally-disposed front and back rollers 28, 30 that rotate in opposite directions as indicated by the illustrated arrows. The back roller 30 extends parallel with the front roller 28 to define a nip point 32. In the embodiment being described, both rollers are about 100" long (wide) and are cooled with chilled water. It is important that the core stock be sheeted out and cooled to prevent scorching or pre-mature crosslinking. This is typically accomplished by banding the core stock around the front roller 28 and stripping off an approximately 36" wide sheet 33 using two spaced-apart knife blades (not shown) at the bottom of the front roller. The two-roll mill typically requires two operators to handle and strip off the sheet 33 from the front roller. Further, the operators manually feed excess core stock that is discharged from the two-roll mill 26 on either side of the sheet 33 (approximately 64" wide) back through the nip point 32 to add to the continuous sheet 33.

It is expected that the core stock will form a smooth band around the front roller, and will adhere to the front roller without bagging, ripping, forming holes or breaks in the stock. As mentioned, bagging occurs when the core stock becomes loose and "bags" or droops down away from the front roller so that the knife blades do not cut the core stock. The cut sheet 33 is manually placed on a conveyor 34 and is then fed into a batch-off cool down unit 36 where the sheet 33 is festooned between moving hangers 38 to be cooled by forced air. As indicated above, it is important that the sheet of core stock be smooth and continuous because any rips or breaks in the core stock will cause the sheet to fall off the hangers 38.

As mentioned, copending U.S. patent application Ser. No. 09/226,340 discloses an improved polybutadiene composition having a high Mooney viscosity and/or a high molecular weight and low dispersity that, when utilized to formulate golf ball cores, produces golf balls that exhibit enhanced C.O.R. without increasing hardness. However, the disclosed high Mooney polybutadiene rubber is very difficult to sheet off the conventional two-roll mill 26. That is, the high Mooney core stock bags, rips, and forms holes and cannot be easily stripped off the front roller 28 to form the continuous sheet 33. Instead, the high Mooney core stock must be manually stripped off the front roller 28 in small pieces and chunks, and dumped onto wooden pallets to cool.

It should be appreciated that it is not only the high Mooney BR rubber that is difficult to process. Newer high performance, softer compression core stocks are "polymer rich" and do not contain high levels of ZDA or excess fillers or extenders to smooth out the core stock. It is possible to improve the processing of polybutadiene rubber by adding natural rubber, polyisoprene, process oils, plasticizers, liquid co-agents, etc. However, these additives disadvantageously lower the performance of the resulting core stock (i.e. the additives reduce the coefficient of restitution of the core stock).

Figure 4:
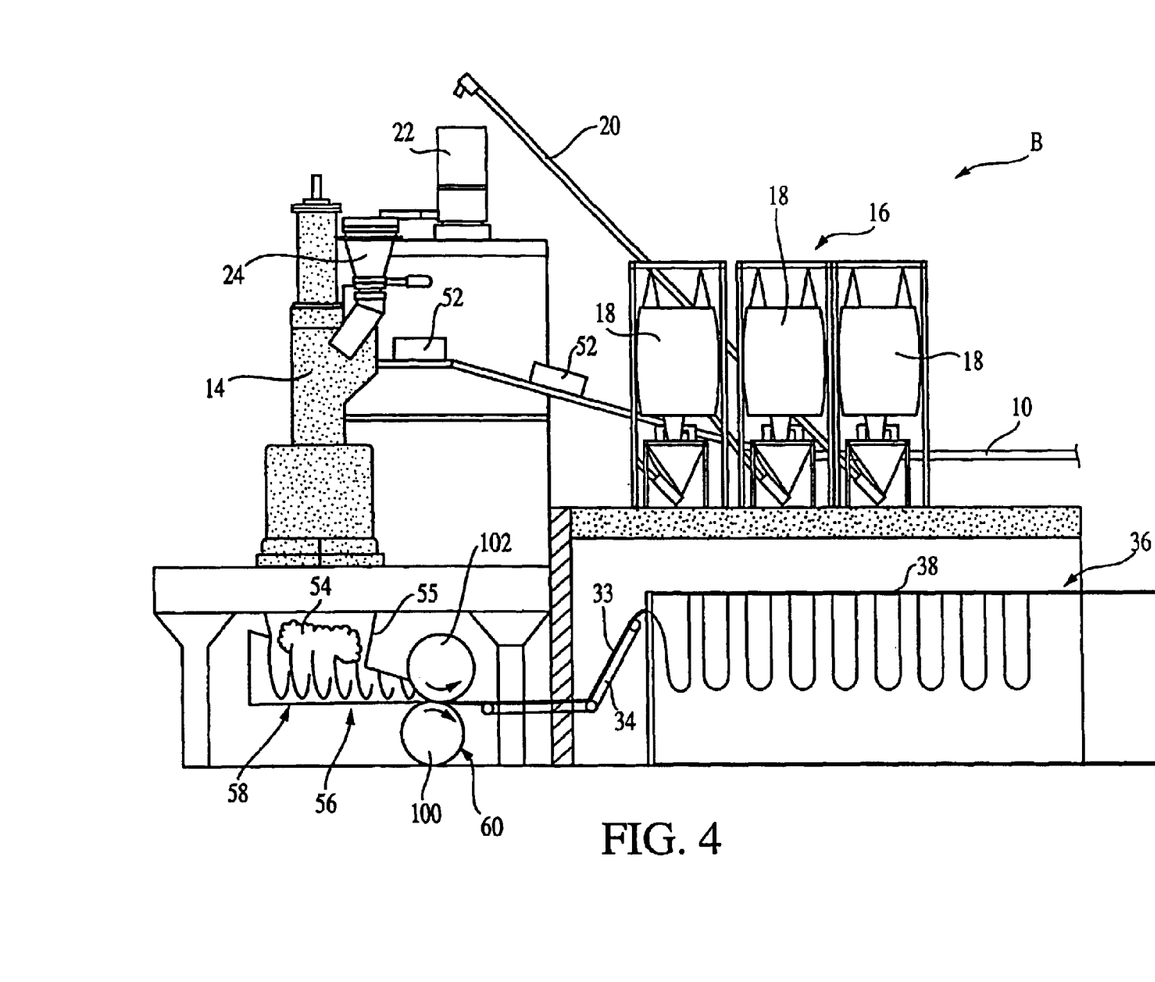
FIG. 4 diagrammatically illustrates a method of processing butadiene rubber compositions in accordance with a first embodiment of the present invention.
Figure 5:
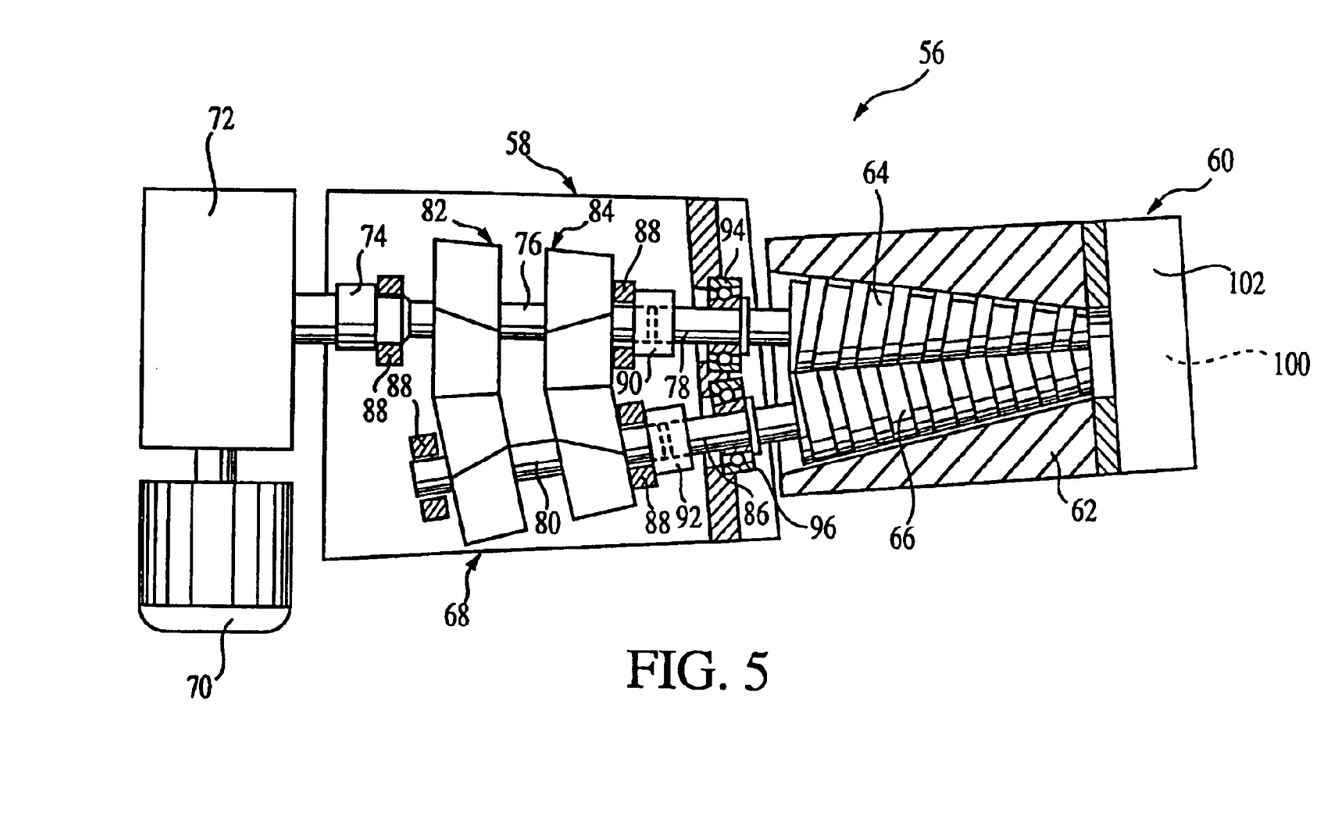
FIG. 5 is a top view of a twin-screw sheeter shown in FIG. 4.

Referring now to FIGS. 4 and 5, a first embodiment of a processing system B for compounding an improved polybutadiene composition having a high Mooney viscosity and/or a high molecular weight and low dispersity is shown. To facilitate describing the processing system B, the same reference numerals are used to indicate components previously described with reference to the processing system 10 of FIG. 3.

Bales of high Mooney BR rubber 52 and bulk powders are intimately mixed together within the mixer 14 until a uniform composition is obtained. When mixing is completed, the core stock 54 is dropped through a bottom door of the mixer 14 and into a retaining hopper 55 of a sheeter 56. The sheeter includes an extruder portion 58 and a two-roll calender portion 60.

In the embodiment being described the extruder portion 58 includes a screw housing 62 with two conical or tapered extruder screws 64, 66, and a drive housing 68. The twin screws 64, 66 are water-cooled and the screw housing 62 is jacketed to control the temperature of the core stock.

A drive motor 70, through a reducing drive 72 and coupling 74, drives a first drive shaft 76 that is rotationally fixed to a screw shaft 78 of the extruder screw 64. The first drive shaft 76 is coupled to a second drive shaft 80 by two sets of counterrotating gears 82, 84 such as inclined tooth bevel gears or intermeshing herringbone tooth bevel gears. The second drive shaft 80 is rotationally fixed to a screw shaft 86 of the extruder screw 66. Both drive shafts 76, 80 are journaled in bearings 88. Further, the drive shafts 76, 80 are coupled to the respective screw shafts 78, 86 by couplings 90, 92. It should be appreciated that the screw shafts 78, 86 can be journaled in thrust bearings 94, 96.

It should also be appreciated that the extruder portion can include a single extruder screw if desired. Further, other drive arrangements are contemplated such as individual direct drives for each of the extruder screws 64, 66. A sheeter suitable for use in the present invention is a Twin-Screw Sheeter™ TSS-series sheeter manufactured by Farrel Corporation of Ansonia, Conn. Suitable single and twin screw sheeters are also available from Pomini, Inc., Rubber & Plastic Division, of Brecksville, Ohio.

In operation, the core stock 54 is dropped into the retaining hopper 55 that is positioned around a throat entrance to the screw housing 62. The counter rotating screws 64, 66 force the core stock toward and into the two-roll calender portion 60. The calender portion 60 includes a fixed-position bottom roller 100 directly driven by a gear reducer and motor assembly (not shown), or by a hydraulic motor (not shown).

A movable top roller 102 extends parallel with the bottom roller and is driven from the bottom roller by connecting gears (not shown). The rollers 100, 102 cooperate to smooth the core stock fed by the screws 64, 66 into a sheet 104 approximately 36" wide. The sheet is then transferred to the batch-off cool down unit 36 in the same manner described above.

It should be appreciated that the sheeter 56 does not require any operators because the core stock 54 is directly formed into the sheet 104 via the screws 64, 66 and two-roll calender portion 60. It should also be appreciated that, with the sheeter, the core stock does not band around either of the rollers 100, 102 but is passed straight through a nip point between the rollers 100, 102 to form the sheet 104 having a desired gauge (i.e. thickness).

Figure 6:
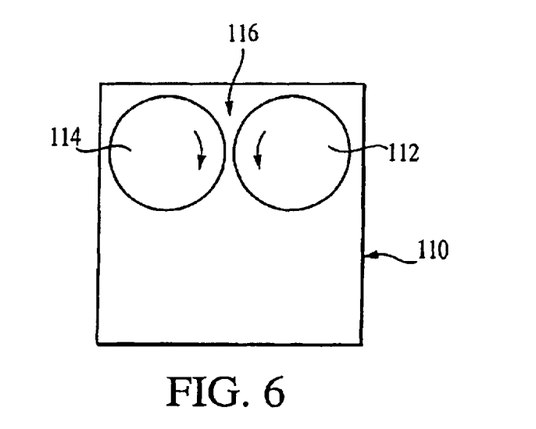
FIG. 6 is a side view of a known two-roll warm-up mill.

The cooled core stock is then tested to determine various physical and rheological properties of the particular batch such as compression, C.O.R., etc. The batch is then processed into individual slugs or preforms that are ultimately compression molded into golf ball cores. More particularly, as shown in FIG. 6, one or more batches of core stock are fed into a conventional two-roll warm-up mill 110. It should be appreciated that different batches of core stocks can be combined together in the mill 110 to produce slugs having certain properties.

The two-roll warm-up mill 110 includes horizontally-disposed front and back rollers 112, 114 that rotate in opposite directions as indicated by the illustrated arrows. The back roller 114 extends parallel with the front roller 112 to define a nip point 116. In the embodiment being described, both rollers are about 60" long (wide) and heat the core stock to about 145° F. As with the two-roll mill 26, the heated core stock bands around the front roller 112. An operator manually strips a portion of the banded core stock off the front roller 112 to form a "pig". A "pig" is a rolled-up strip of heated core stock that has a predetermined diameter, such as approximately 10"–12". It is contemplated that a "pig rolling" device could be used to automatically roll the heated core stock into "pigs" of the required diameter.

The "pigs" have a temperature of about 145° F. after coming off the warm up mill 110. It is known that this temperature produces a smooth preform or slug. Cold "pigs" produce very rough slugs, and more pressure is required to force the stock through a preform die (discussed below). It is contemplated that cold "pigs" can be pre-warmed to approximately 145° F. in a hot air oven prior to forming the slugs. Suitable hot air ovens are available from Barwell Inc. of Tallmadge, Ohio 44278.

Figure 7:
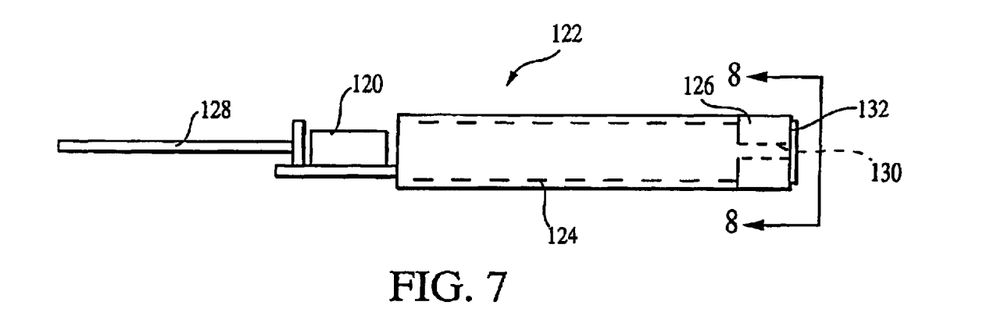
FIG. 7 is a side view of a known hydraulic extruder.
Figure 8:
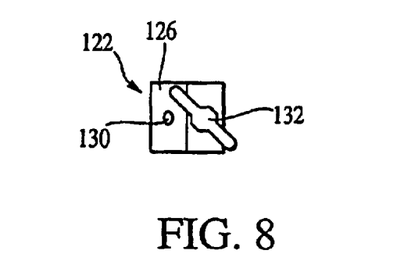
FIG. 8 is an end view of the hydraulic extruder taken along the line 8—8 of FIG. 7.

As shown in FIGS. 7 and 8, one or more "pigs" of heated core stock 120 are taken off the warm-up mill 110 and fed into a hydraulic extruder 122 such as a known Barwell Preformer device. The Barwell Preformer includes a cylinder portion 124 having a die head portion 126 at one end and a hydraulic ram portion 128 at the other end. In operation, the one or more pigs 120 are loaded into the cylinder 124 and the die head 126 is closed and locked. A vacuum is applied to the inside of the cylinder to remove any air that could cause voids or air pockets in the slugs. The hydraulic ram 128 at the far end of the cylinder forces the core stock 120 through a Teflon oval die 130 associated with the die head 126. As a solid oval rod of core stock exits the die 130, a cutting device 132 cuts the rod into preforms or slugs.

It is contemplated that the cutting device 132 can have one or more cutting blades or other means for cutting the core stock into the preforms or slugs of predetermined size and/or weight. The weight or size of the cut preforms are controlled through a volume control that synchronizes the cutting device 132 with the advance of the hydraulic ram 128. The cut slugs or preforms are then dusted with an anti-sticking agent such as zinc stearate to keep them from sticking together. The slugs are then compression molded to form golf ball cores in a conventional manner.

It should be appreciated that the heated sheet of core stock 104 (FIG. 4) that is discharged from the sheeter 56 could be directly rolled into "pigs" (either manually or automatically) rather than being conveyed to the batch off cool down unit 36 as described above. However, in this alternate embodiment, it is not feasible to combine different batches of core stock (to produce certain core properties) prior to forming the "pigs".

Figure 9:
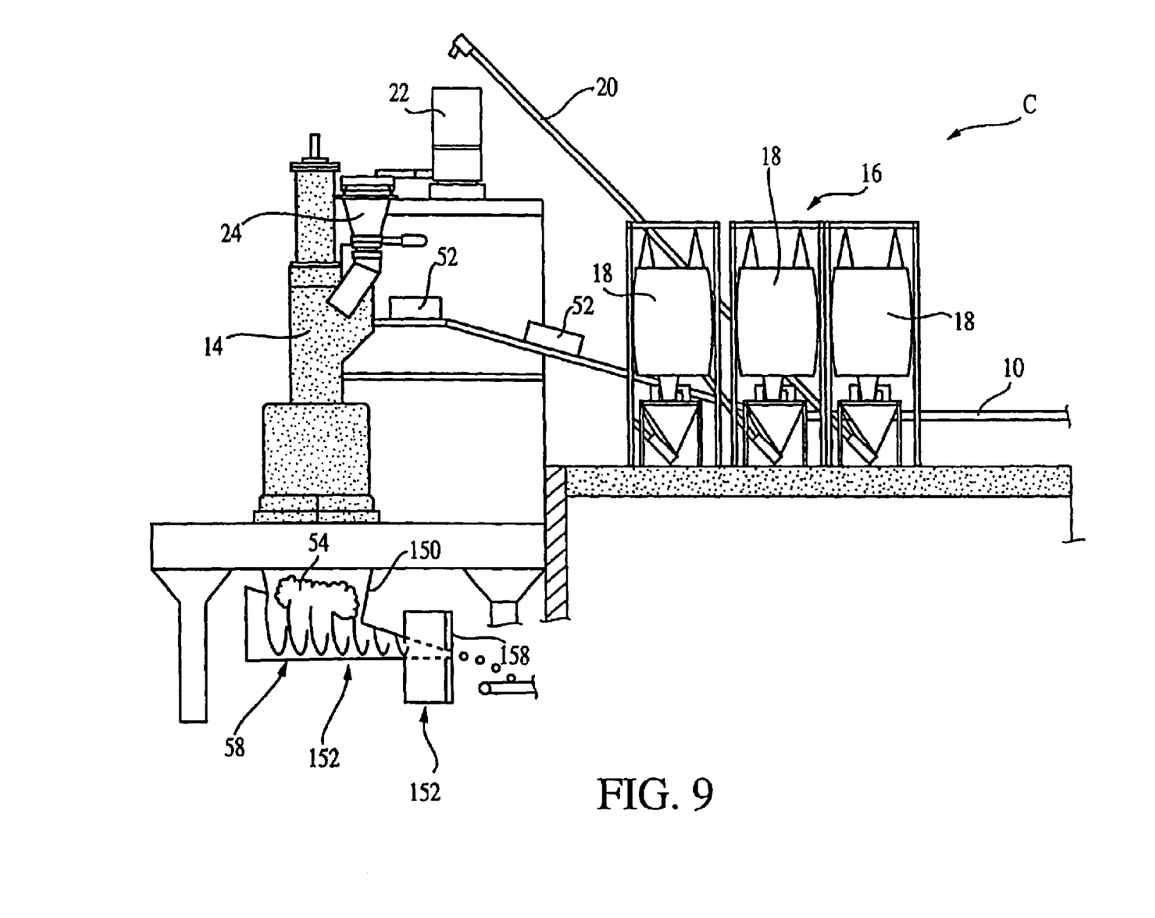
FIG. 9 diagrammatically illustrates a method of processing butadiene rubber compositions in accordance with a second embodiment of the present invention.
Figure 10:
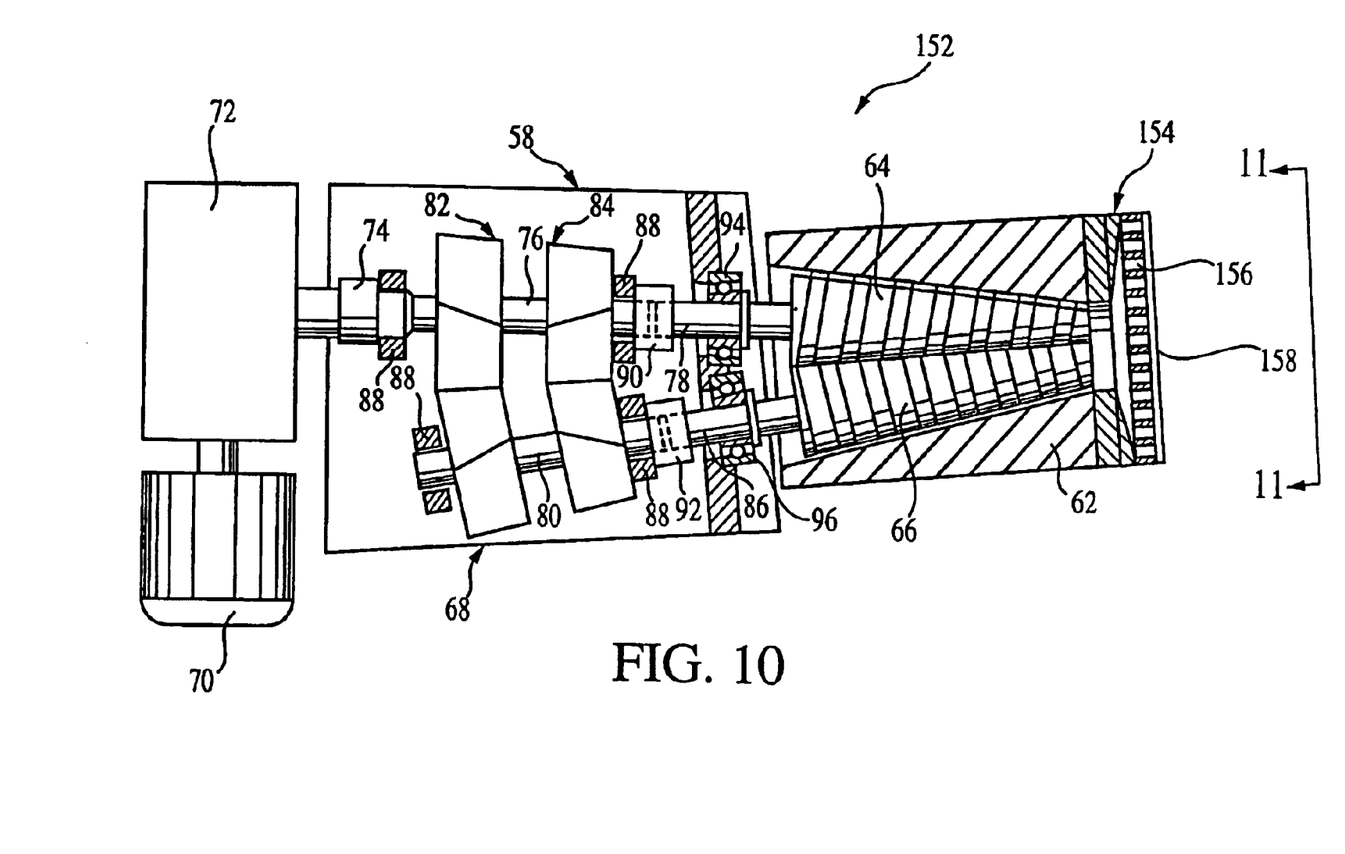
FIG. 10 is a top view of a twin-screw sheeter shown in FIG. 9.

Referring now to FIGS. 9 and 10, a second embodiment of a processing system C for compounding an improved polybutadiene composition having a high Mooney viscosity and/or a high molecular weight and low dispersity is shown. Again, to facilitate describing the processing system C, the same reference numerals are used to indicate components previously described with reference to the processing systems of FIGS. 3–8.

Bales of high Mooney BR rubber 52 and bulk powders are intimately mixed together within the mixer 14 until a uniform composition is obtained. When mixing is completed, the core stock 54 is dropped through a bottom door of the mixer 14 and into a retaining hopper 150 of a sheeter 152. The sheeter includes the extruder portion 58 and a die head portion 154.

As previously described, the extruder portion 58 can include the screw housing 62 with the two conical or tapered extruder screws 64, 66, and the drive housing 68. The twin screws 64, 66 are water-cooled and the screw housing 62 is jacketed to control the temperature of the core stock.

The drive motor 70, through the reducing drive 72 and coupling 74, drives the first drive shaft 76 that is rotationally fixed to the screw shaft 78 of the extruder screw 64. The first drive shaft 76 is coupled to the second drive shaft 80 by the counterrotating gears 82, 84 such as inclined tooth bevel gears or intermeshing herringbone tooth bevel gears. The second drive shaft 80 is rotationally fixed to the screw shaft 86 of the extruder screw 66. Both drive shafts 76, 80 are journaled in bearings 88. Further, the drive shafts 76, 80 are coupled to the respective screw shafts 78, 86 by couplings 90, 92. It should be appreciated that the screw shafts 78, 86 can be journaled in the thrust bearings 94, 96. The extruder portion can include a single extruder screw if desired. Further, other drive arrangements are contemplated such as individual direct drives for each of the extruder screws 64, 66.

Figure 11:
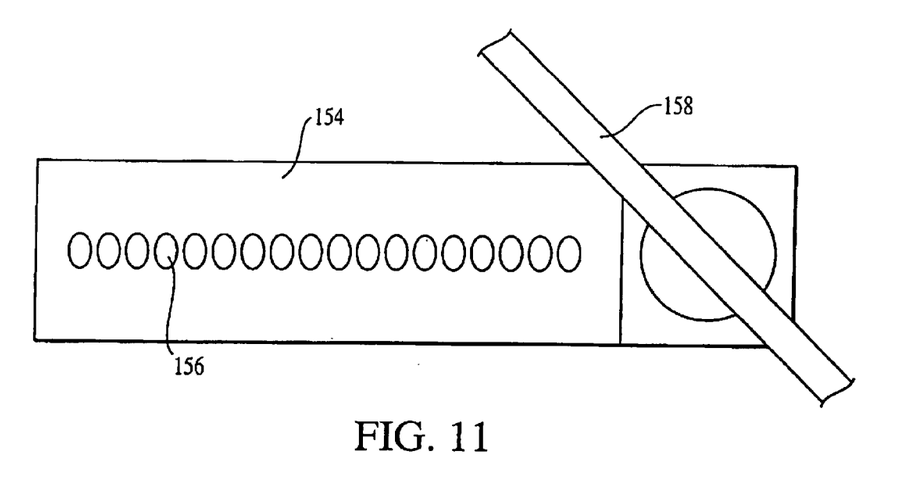
FIG. 11 is a front view of a die head portion of the twin-screw sheeter taken along the line 11—11 of FIG. 10.

In operation, the core stock 54 is dropped into a retaining hopper 98 positioned around a throat entrance to the screw housing 62. The counter rotating screws 64, 66 force the core stock into the die head portion 154. In the described embodiment shown in FIG. 11, the die head portion is about 36" long and 2" thick with approximately 18 oval Teflon dies 156 therethrough. A cutting device 158 such as a reciprocating wire cutter or thin blade cuts 18 slugs per cut. The speed of the cutter or blade is synchronized with the rotational speed of the extruder portion 58. The resulting slugs 160 are then conveyed to a tumbler (not shown) for dusting with zinc stearate to keep them separate. The slugs are then compression molded into cores in a conventional manner.

It should be appreciated that the sheeter 152 does not require any operators because the core stock 54 is directly formed into preforms or slugs via the screws 64, 66 and the die head 154. Thus, it is possible to eliminate the two-roll warm-up mill 110 and the hydraulic extruder 122 by replacing the roller head die 60 on the sheeter 56 (FIG. 4) with the extruder die head 154. However, in this embodiment, it is not feasible to combine different batches of core stock (to produce certain core properties) prior to extruding the preforms or slugs.

The term "solid cores" as used herein refers not only to one piece cores but also to those cores having a separate solid layer beneath the cover and above the core as in U.S. Pat. No. 4,431,193, and other multi-layer and/or non-wound cores. Although both solid core and wound cores can be utilized in the present invention, as a result their lower cost and superior performance, solid molded cores are preferred over wound cores.

The specially produced core compositions and resulting molded cores of the present invention are manufactured using polybutadiene, and mixtures of polybutadiene with other elastomers. It is preferred that the base elastomer have a relatively high molecular weight and a high Mooney viscosity.

More preferably, the polybutadiene resin for use in the present invention has a relatively ultra high Mooney viscosity. A "Mooney" unit is an arbitrary unit used to measure the plasticity of raw, or unvulcanized rubber. The plasticity in Mooney units is equal to the torque, measured on an arbitrary scale, on a disk in a vessel that contains rubber at a temperature of 212° F. (100° C.) and that rotates at two revolutions per minute.

The measurement of Mooney viscosity, i.e. Mooney viscosity [$ML_{1+4}$ (100° C.)], is defined according to the standard ASTM D-1646, herein incorporated by reference. In ASTM D-1646, it is stated that the Mooney viscosity is not a true viscosity, but a measure of shearing torque over a range of shearing stresses. Measurement of Mooney viscosity is also described in the *Vanderbilt Rubber Handbook*, 13th Ed., (1990), pages 565–566, also herein incorporated by reference. Generally, polybutadiene rubbers have Mooney viscosities, measured at 212° F., of from about 25 to about 65. Instruments for measuring Mooney viscosities are commercially available such as a Monsanto Mooney Viscometer, Model MV 2000. Another commercially available device is a Mooney viscometer made by Shimadzu Seisakusho Ltd.

As will be understood by those skilled in the art, polymers may be characterized according to various definitions of molecular weight. The "number average molecular weight," $M_n$, is defined as:

$$M_n = \frac{\sum W_i}{\sum W_i / M_i}$$

where $W_i$ is the molecular weight of a fraction or sample of the polymer and $M_i$ is the total number of fractions or samples.

"Weight average molecular weight," $M_w$, is defined as:

$$M_w = \frac{\sum W_i M_i}{\sum W_i}$$

where $W_i$ and $M_1$ have the same meanings as noted above.

The "Z-average molecular weight," $M_z$, is defined as:

$$M_z = \frac{\sum W_i M_i^2}{\sum W_i M_i}$$

where $W_i$ and $M_i$ also have the same meanings as noted above.

"$M_{peak}$" is the molecular weight of the most common fraction or sample, i.e. having the greatest population.

Considering these various measures of molecular weight, provides an indication of the distribution or rather the "spread" of molecular weights of the polymer under review.

A common indicator of the degree of molecular weight distribution of a polymer is its "polydispersity," P:

$$P = \frac{M_w}{M_n}$$

Polydispersity, or "dispersity" as sometimes referred to herein, also provides an indication of the extent to which the polymer chains share the same degree of polymerization. If the polydispersity is 1.0, then all polymer chains have the same degree of polymerization. Since weight average molecular weight is always equal to or greater than the number average molecular weight, polydispersity, by definition, is equal to or greater than 1.0:

$$P \geq 1.0$$

The particular polybutadiene for use in the preferred embodiment compositions of the present invention (i) exhibits a Mooney viscosity of from about 65 to about 85, and preferably from about 70 to about 83; ii) has a number average molecular weight $M_n$ of from about 90,000 to about 130,000; and preferably from about 100,000 to about 120,000; iii) has a weight average molecular weight $M_w$ of from about 250,000 to about 350,000; and preferably from about 290,000 to about 310,000; iv) has a Z-average molecular weight $M_z$ of about 600,000 to about 750,000; and preferably from about 660,000 to about 700,000; and, v) has a peak molecular weight $M_{peak}$ of about 150,000 to about 200,000; and preferably from about 170,000 to about 180,000.

The polydispersity of the particular polybutadiene for use in the preferred embodiment compositions typically ranges from about 1.9 to about 3.9; and preferably from about 2.4 to about 3.1. Most preferably, the polydispersity is about 2.7.

The particular polybutadiene for use in the preferred embodiment compositions preferably contains a majority fraction of polymer chains containing a cis-1,4 bond, more preferably, having a cis-1,4 polybutadiene content of about 90%, and most preferably, having a cis-1,4 polybutadiene content of at least about 95%. Although not wishing to be bound to any particular theory, the present inventor has also discovered that a preferred polybutadiene, as described herein, is obtained by utilizing a cobalt or cobalt-based catalyst. However, polybutadienes exhibiting the foregoing characteristics, which are obtained by using a lanthanum rare earth catalyst, nickel catalyst, or mixtures thereof, are also encompassed by the present invention. It is also envisioned that other catalysts could be utilized to produce the particular preferred polybutadienes described herein. Examples of such other catalysts include, but are not limited to aluminum, boron, lithium, neodymium, titanium, and combinations thereof.

The polybutadiene utilized in the present invention is a solid at room temperature. Consequently, the polybutadiene is referenced as a "solid" polybutadiene, as opposed to a "liquid" which generally means that the rubber is flowable at room temperature.

A commercially available polybutadiene corresponding to the noted preferred ultra-high viscosity polybutadiene, and which is suitable for use in the preferred embodiment compositions in accordance with the present invention is available under the designation Cariflex BCP 820, from Shell Chimie of France. The properties and characteristics of this preferred polybutadiene are set forth below in Table 1.

TABLE 1

Properties of Shell Chimie BCP 820 (Also known as BR-1202J)

| Property | Value |
| --- | --- |
| Mooney Viscosity (approximate) | 73–83 |
| Volatiles Content | 0.5% maximum |
| Ash Content | 0.1% maximum |
| Cis 1,4-polybutadiene Content | 95.0% minimum |
| Stabilizer Content | 0.2 to 0.3% |
| Polydispersity | 2.7 |

| Molecular Weight Data: | Trial 1 | Trial 2 |
| --- | --- | --- |
| $M_n$ | 110,000 | 111,000 |
| $M_w$ | 300,000 | 304,000 |
| $M_z$ | 680,000 | |
| $M_{peak}$ | 175,000 | |

The compositions of the present invention may also utilize other polybutadiene resins in addition to the noted particular polybutadiene exhibiting an ultra-high Mooney viscosity, such as the BCP 820 resin. For example, Cariflex BR-1220 polybutadiene available from Shell Chemical (see Table 2 below); and Taktene 220 polybutadiene available from Bayer Corp. of Orange, Tex. (see Tables 3A and 3B below) may be utilized as other polybutadienes in combination with the particular ultra-high Mooney viscosity polybutadiene component described herein. Generally, these other polybutadienes have Mooney viscosities in the range of about 25 to 65. It is also contemplated that a similar polybutadiene resin, BCP 819, commercially available from Shell Chimie, may be used in conjunction with BCP 820.

TABLE 2

Properties of Cariflex BR-1220 Polybutadiene

Physical Properties:

Polybutadiene Rubber
CIS 1,4 Content - 97%–99% Min.
Stabilizer Type - Non Staining
Total Ash - 0.5% Max.
Specific Gravity - 0.90–0.92
Color - Transparent, clear, Lt. Amber
Moisture - 0.3% max. ASTM 1416.76 Hot Mill Method
Polymer Mooney Viscosity - (35–45 Cariflex) (ML1 + 4 @ 212° F.)
90% Cure - 10.0–13.0
Polydispersity 2.75–3.0

| Molecular Weight Data: | Trial 1 | Trial 2 |
| --- | --- | --- |
| $M_n$ | 80,000 | 73,000 |
| $M_w$ | 220,000 | 220,000 |
| $M_z$ | 550,000 | |
| $M_{peak}$ | 110,000 | |

TABLE 3A

Properties of Taktene 220 Polybutadiene

Physical Properties:

Polybutadiene Rubber
CIS 1, 4 Content (%) - 98% Typical
Stabilizer Type - Non Staining 1.0–1.3%
Total Ash - 0.25 Max.
Raw Polymer Mooney Visc. –35–45 40 Typical
(ML1 + 4' @ 212 Deg. F./212° F.)
Specific Gravity - 0.91
Color - Transparent - almost colorless (15 APHA Max.)
Moisture % - 0.30% Max. ASTM 1416-76 Hot Mill Method

TABLE 3B

Properties of Taktene 220 Polybutadiene

| Product Description | A low Mooney viscosity, non-staining, solution polymerized, high cis-1,4-polybutadiene rubber. | | |
| --- | --- | --- | --- |
| | Property | Range | Test Method |
| Raw Polymer Properties | Mooney viscosity 1 + 4(212° F.) | 40 ± 5 | ASTM D 1646 |
| | Volatile matter (wt %) | 0.3 max. | ASTM D 1416 |
| | Total Ash (wt %) | 0.25 max. | ASTM D 1416 |
| Cure[(1)(2)] | Minimum torque | | |
| Characteristics | $M_L$(dN.m) | 9.7 ± 2.2 | ASTM D 2084 |
| | (lbf).in) | 8.6 ± 1.9 | ASTM D 2084 |

TABLE 3B-continued

Properties of Taktene 220 Polybutadiene

Maximum torque

| | | |
|---|---|---|
| $M_H$ (dN.m) | 35.7 ± 4.8 | ASTM D 2084 |
| (lbf.in) | 31.6 ± 4.2 | ASTM D 2084 |
| $t_21$ (min) | 4 ± 1.1 | ASTM D 2084 |
| t'50 (min) | 9.6 ± 2.5 | ASTM D 2084 |
| t'90 (min) | 12.9 ± 3.1 | ASTM D 2084 |

| | Property | Typical Value |
|---|---|---|
| Other Product Features | Specific gravity | 0.91 |
| | Stabilizer type | Non-staining |

[1] Monsanto Rheometer at 160° C., 1.7 Hz (100 cpm), 1 degree arc, micro-die
[2] Cure characteristics determined on ASTM D 3189 MIM mixed compound:

| | |
|---|---|
| TAKTENE 220 | 100 (parts by mass) |
| Zinc oxide | 3 |
| Stearic acid | 2 |
| IRB #6 black (N330) | 60 |
| Naphthenic oil | 15 |
| TBBS | 0.9 |
| Sulfur | 1.5 |

*This specification refers to product manufactured by Bayer Corp., Orange, Texas, U.S.A.

The preferred embodiment core compositions of the present invention generally comprise about 100 parts by weight of elastomeric or rubber components, i.e. the noted ultra-high Mooney viscosity polybutadiene, and from about 60 to about 80, or more, parts by weight of non-rubber or non-elastomeric components. Preferably, the core compositions comprise about 100 parts of rubber components and from about 60 to about 80, or more, parts by weight of non-rubber components. It will be understood that depending upon the types and respective function of components added to the non-rubber portion of the preferred embodiment core compositions, that the non-rubber portion may constitute a significant proportion of the rubber component. The rubber components include the previously described ultra-high Mooney viscosity polybutadiene. The non-rubber components are as follows.

Preferably, the crosslinking agent of the core composition is an unsaturated carboxylic acid component which is the reaction product of a carboxylic acid or acids and an oxide or carbonate of a metal such as zinc, magnesium, barium, calcium, lithium, sodium, potassium, cadmium, lead, tin, and the like. Preferably, the oxides of polyvalent metals such as zinc, magnesium and cadmium are used, and most preferably, the oxide is zinc oxide.

Exemplary of the unsaturated carboxylic acids which find utility in the preferred core compositions are acrylic acid, methacrylic acid, itaconic acid, crotonic acid, sorbic acid, and the like, and mixtures thereof. Preferably, the acid component is either acrylic or methacrylic acid. Usually, from about 15 to about 50, and preferably from about 20 to about 35 parts by weight of the carboxylic acid salt, such as zinc diacrylate (ZDA), is included per 100 parts of the rubber components in the core composition. The unsaturated carboxylic acids and metal salts thereof are generally soluble in the elastomeric base, or are readily dispersible.

The free radical initiator included in the core composition is any known polymerization initiator (a co-crosslinking agent) which decomposes during the cure cycle. The term "free radical initiator" as used herein refers to a chemical which, when added to a mixture of the elastomeric blend and a metal salt of an unsaturated, carboxylic acid, promotes crosslinking of the elastomers by the metal salt of the unsaturated carboxylic acid. The amount of the selected initiator present is dictated only by the requirements of catalytic activity as a polymerization initiator. Suitable initiators include peroxides, persulfates, azo compounds and hydrazides. Peroxides which are readily commercially available are conveniently used in the present invention, generally in amounts of from about 0.1 to about 10.0 and preferably in amounts of from about 0.3 to about 3.0 parts by weight per each 100 parts of elastomer.

Exemplary of suitable peroxides for the purposes of the present invention are dicumyl peroxide, n-butyl 4,4'-bix (buylperoxy) valerate, 1,1-bis (t-butylperoxy)-3,3,5-trimethyl cyclohexane, di-t-butyl peroxide and 2,5-di-(t-butylperoxy)-2,5 dimethyl hexane and the like, as well as mixtures thereof. It will be understood that the total amount of initiators used will vary depending on the specific end product desired and the particular initiators employed.

Examples of such commercial available peroxides are Luperco 230 or 231 XL, a peroxyketal manufactured and sold by Atochem, Lucidol Division, Buffalo, N.Y., and Trigonox 17/40 or 29/40, a peroxyketal manufactured and sold by Akzo Chemie America, Chicago, Ill. The one hour half life of Luperco 231 XL and Trigonox 29/40 is about 112° C., and the one hour half life of Luperco 230 XL and Trigonox 17/40 is about 129° C. Luperco 230 XL and Trigonox 17/40 are n-butyl-4,4-bis(t-butylperoxy) valerate and Luperco 231 XL and Trigonox 29/40 are 1,1-di(t-butylperoxy) 3,3,5-trimethyl cyclohexane.

The core compositions of the present invention may additionally contain any other suitable and compatible modifying ingredients including, but not limited to, metal oxides, fatty acids, and diisocyanates. For example, Papi 94, a polymeric diisocyanate, commonly available from Dow Chemical Co., Midland, Mich., is an optional component in the rubber compositions. It can range from about 0 to 5 parts by weight per 100 parts by weight rubber (phr) component, and acts as a moisture scavenger.

Various activators may also be included in the compositions of the present invention. For example, zinc oxide and/or magnesium oxide are activators for the polybutadiene. The activator can range from about 2 to about 10 parts by weight per 100 parts by weight of the rubbers (phr) component.

The preferred fillers are relatively inexpensive and heavy and serve to lower the cost of the ball and to increase the weight of the ball to closely approach the U.S.G.A. weight limit of 1.620 ounces. Exemplary fillers include mineral fillers such as limestone, zinc oxide, silica, mica, barytes, calcium carbonate, or clays. Limestone is ground calcium/magnesium carbonate and is used because it is an inexpensive, heavy filler. Other heavy weight fillers include metal particles, such as powdered tungsten.

As indicated, ground flash filler may be incorporated and is preferably 20 mesh ground up center stock from the excess flash from compression molding. It lowers the cost and may increase the hardness of the ball.

Fatty acids or metallic salts of fatty acids, or metal soaps, may also be included in the compositions, functioning to improve moldability and processing. Generally, free fatty acids having from about 10 to about 40 carbon atoms, and preferably having from about 15 to about 20 carbon atoms, are used. Exemplary of suitable fatty acids are stearic acid, palmitic, oleic and linoleic acids, as well as mixtures thereof. Exemplary of suitable metallic salts of fatty acids include zinc stearate. When included in the core compositions, the fatty acid component is present in amounts of from about 1 to about 25, preferably in amounts from about 20 to about 15 parts by weight based on 100 parts rubber (elastomer).

It is preferred that the core compositions include stearic acid as the fatty acid adjunct in an amount of from about 2 to about 5 parts by weight per 100 parts of rubber.

Diisocyanates may also be optionally included in the core compositions when utilized, the diioscyanates are included in amounts of from about 0.2 to about 5.0 parts by weight based on 100 parts rubber. Exemplary of suitable diisocyanates is 4,4'-diphenylmethane diisocyanate and other polyfunctional isocyanates known to the art.

Furthermore, the dialkyl tin difatty acids set forth in U.S. Pat. No. 4,844,471, the dispersing agents disclosed in U.S. Pat. No. 4,838,556, and the dithiocarbonates set forth in U.S. Pat. No. 4,852,884 may also be incorporated into the polybutadiene compositions of the present invention. The specific types and amounts of such additives are set forth in the above-identified patents, which are incorporated herein by reference.

As indicated above, additional suitable and compatible modifying agents such as fatty acids, and secondary additives such as Pecan shell flour, ground flash (i.e. grindings from previously manufactured cores of substantially identical construction), barium sulfate, zinc oxide, etc. may be added to the core compositions to increase the weight of the ball as necessary in order to have the ball reach or closely approach the U.S.G.A. weight limit of 1.620 ounces.

The core compositions of the invention are generally comprised of 100 parts by weight of a base elastomer (or rubber) selected from polybutadiene and mixtures of polybutadiene with other elastomers, 15 to 25 parts by weight of at least one metallic salt of an unsaturated carboxylic acid, and 1 to 10 parts by weight of a free radical initiator.

As indicated above, additional suitable and compatible modifying agents such as particulate polypropylene resin, fatty acids, and secondary additives such as Pecan shell flour, ground flash (i.e. grindings from previously manufactured cores of substantially identical construction), barium sulfate, zinc oxide, etc. may be added to the core compositions to adjust the weight of the ball as necessary in order to have the finished molded ball (core, cover and coatings) to closely approach the U.S.G.A. weight limit of 1.620 ounces.

In producing golf ball cores utilizing the disclosed compositions, the ingredients may be processed using the processing systems B and C. It should be appreciated that the sequence of adding the ingredients into the mixer 14 is not critical. However, a preferred blending sequence is as follows.

The elastomer, polypropylene powder resin (if desired), fillers, zinc salt, metal oxide, fatty acid, and the metallic dithiocarbamate (if desired), surfactant (if desired), and tin difatty acid (if desired), are blended for about 7 minutes in the internal mixer 14. As a result of shear during mixing, the temperature rises to about 200° F. The initiator and diisocyanate are then added and the mixing continued until the temperature reaches about 220° F. whereupon the batch is discharged onto the sheeter 56, 152 and sheeted out.

The sheets are eventually formed into slugs or preforms vis-a-vis the die head 154 or the hydraulic preformer 122. The slugs are then subjected to compression molding at about 320° F. for about 14 minutes. After molding, the molded cores are cooled, the cooling effected at room temperature for about 4 hours or in cold water for about one hour. The molded cores are subjected to a centerless grinding operation whereby a thin layer of the molded core is removed to produce a round core having a diameter of 1.540 to 1.545 inches. Alternatively, the cores are used in the as-molded state with no grinding needed to achieve roundness.

It should be appreciated that the mixing is desirably conducted in such a manner that the composition does not reach incipient polymerization temperatures during the blending of the various components.

Usually the curable component of the composition will be cured by heating the composition at elevated temperatures on the order of from about 275° F. to about 350° F., preferably and usually from about 290° F. to about 325° F., with molding of the composition effected simultaneously with the curing thereof. The composition can be formed into a core structure by any one of a variety of molding techniques, e.g. injection, compression, or transfer molding. When the composition is cured by heating, the time required for heating will normally be short, generally from about 10 to about 20 minutes, depending upon the particular curing agent used. Those of ordinary skill in the art relating to free radical curing agents for polymers are conversant with adjustments of cure times and temperatures required to effect optimum results with any specific free radical agent.

After molding, the core is removed from the mold and the surface thereof, preferably treated to facilitate adhesion thereof to the covering materials. Surface treatment can be effected by any of the several techniques known in the art, such as corona discharge, ozone treatment, sand blasting, and the like. Preferably, surface treatment is effected by grinding with an abrasive wheel.

In addition to using solid molded cores, wound cores may also be incorporated in the golf balls of the present invention. Such wound covers would include a generally spherical center and a rubber thread layer, or windings, enclosing the outer surface of the center.

In this regard, the generally spherical center of the wound cores may be a solid center or a liquid center. The solid center can consist of one or more layers. For example, the solid center can comprise a molded polybutadiene rubber sphere which, although smaller in size, is of similar construction to the molded cores in the two-piece molded golf balls described above.

Suitable solid centers used in the invention are not particularly limited to, but include those made of vulcanized rubber. Such solid centers may be prepared by adding to butadiene rubber, additives such as vulcanizing agents, accelerators, activating agents, fillers, emodifiers and aids and then subjecting the mixture to vulcanization and molding.

The solid center (whether of single unitary construction or of multi-layers) generally is from 1 to 1.5 inches in diameter, preferably 1.0625 to 1.42 inches, with a weight of 15 grams to 36 grams, preferably 16.5 to 30 grams.

The wound core is formed by winding conventional thread rubber around the outer periphery of the solid center. The thread rubber may include, for example, those prepared by subjecting natural rubber, or a blend of natural rubber and polyisoprene rubber to vulcanization and molding. The winding process is under high tension to produce a threaded layer over the solid or liquid center. Conventional techniques may be employed in winding the thread rubber and known compositions may be used. Although the thread rubber is not limited with respect to specific gravity, dimension and gage, it usually has a specific gravity of 0.9 to 1.1, a width of 0.047 to 0.094 and a gage of 0.012 to 0.026.

The rubber thread layer has a radial thickness of 0.010 to 0.315 inches and comprises a wound core having an outer diameter of 1.52 to 1.63 inches. The overall weight of the wound core is 33 to 44 grams, preferably 35 to 39 grams.

The core is converted into a golf ball by providing at least one layer of known covering material (i.e. ionomer resins, synthetic or natural balata, polyurethane, etc.) thereon, ranging in thickness from about 0.070 to about 0.130 inches and preferably from about 0.0675 to about 0.1275 inches.

As indicated, the golf balls of the present invention may be produced by forming covers around cores by conventional molding processes. For example, in compression molding, the cover composition is formed via injection at about 380° F. to about 450° F. into smooth surfaced hemispherical shells which are then positioned around the core in a dimpled golf ball mold and subjected to compression molding at 200–300° F. for 2–10 minutes, followed by cooling at 50–70° F. for 2–10 minutes, to fuse the shells together to form an unitary ball. In addition, the golf balls may be produced by injection molding, wherein the cover composition is injected directly around the core placed in the center of a golf ball mold for a period of time at a mold temperature of from 50° F. to about 100° F. After molding the golf balls produced may undergo various further processing steps such as buffing, painting, and marking.

A soft, dimpled cover layer preferably is formed from a cover material which has a flex modulus of 20–200 MPa, preferably 20–150 MPa, and more preferably 20–100 MPa. When a blend of hard and soft ionomers is used, the weight ratio of hard to soft ionomer is generally in the range of 3 to 97 and 80 to 20.

Golf balls according to the invention preferably have a PGA compression of 10–110. In a particularly preferred form of the invention, the golf balls have a PGA compression of about 40–100. It has been found that excellent results are obtained when the PGA compression of the golf balls is 60–100. The coefficient of restitution of the golf balls of the invention is in the range of 0.770 or greater. Preferably, the C.O.R. of the golf balls is in the range of 0.770–0.830 and most preferably 0.790–0.830.

The invention has been described with reference to the preferred embodiment(s). Obviously, modifications and alterations will occur to others upon reading and understanding the preceding detailed description. It is intended that the invention be construed as including all such modifications and alterations insofar as they come within the scope of the appended claims or the equivalents thereof.

For instance, it is contemplated that the processing systems B and C of the present invention can be used to process polybutadiene rubber compositions not having a high Mooney viscosity and/or a high molecular weight and a low dispersity.

Having thus described the preferred embodiment(s), the invention is now claimed to be:

1. An improved processing system for forming golf ball preforms comprising high Mooney viscosity polybutadiene, said system comprising:
   an internal mixer that compounds a batch of golf ball core stock, the internal mixer having a mixer outlet;
   a sheeter that forms sheets of golf ball core stock, the sheeter having a sheeter inlet proximate the mixer outlet and having a sheeter outlet;
   wherein the sheeter includes:
   an extruder portion and a calendar portio;
   the extruder portion receiving the compounded golf ball core stock from the mixer outlet and having at least one screw that feeds the compounded golf ball core stock to the calendar portion;
   the calendar portion having a first roller and a second roller that is upwardly displaced from the first roller to define a nip point where the sheets of golf ball core stock are formed from the compounded golf ball core stock; and
   preform shaping means for forming golf ball core preforms from the sheets of golf ball core stock;
   wherein the improved processing system eliminates the need for two-roll mill.

2. The system of claim 1, wherein the preform shaping means includes:
   a warm-up mill for warming the sheets of golf ball core stock; and
   an extruder for forming golf ball core preforms of a desired shape from the warmed sheets of golf ball core stock.

3. The system of claim 2, further including a cool down unit for cooling the sheets of golf ball core stock prior to being warmed by the warm-up mill.

4. The system of claim 3, wherein the warm-up mill combines the first-mentioned batch of golf ball core stock with a second batch of core stock to form the warmed sheets of golf ball core stock.

5. The system of claim 2, further including means for rolling the warmed sheets of golf ball core stock into "pigs" prior to being extruded into the golf ball core preforms.

6. The system of claim 1, wherein the extruder portion includes two counter-rotating screws that feed the compounded golf ball core stock to the calendar portion.

7. The system of claim 1, further including an extruder that forms golf ball core preforms of a desired shape from the sheets of golf ball core stock.

8. The system of claim 7, further including means for rolling the sheets of golf ball core stock into "pigs" prior to being extruded into golf ball core preforms.

9. An improved processing system for forming golf ball preforms comprising high Mooney viscosity polybutadiene, said system comprising:
   an internal mixer that compounds a batch of golf ball core stock, the internal mixer having a mixer outlet;
   a sheeter that forms sheets of golf ball core stock, the sheeter having a sheeter inlet proximate the mixer outlet and having a sheeter outlet;
   wherein the sheeter includes:
   an extruder portion and a die head portion;
   the extruder portion receiving the compounded golf ball core stock from the mixer outlet and having at least one screw that feeds the compounded golf ball core stock to the die head portion;
   the die head portion having at least one die and the compounded golf ball core stock being extruded through the at least one die to form golf ball preforms of a desired shape.

10. The system of claim 9, wherein the extruder portion includes two counter-rotating screws that feed the compounded golf ball core stock to the die head portion.

* * * * *